May 28, 1940.　　　C. MARINELLO　　　2,202,015
TRUCK BODY CONSTRUCTION
Filed May 3, 1939　　　3 Sheets-Sheet 2
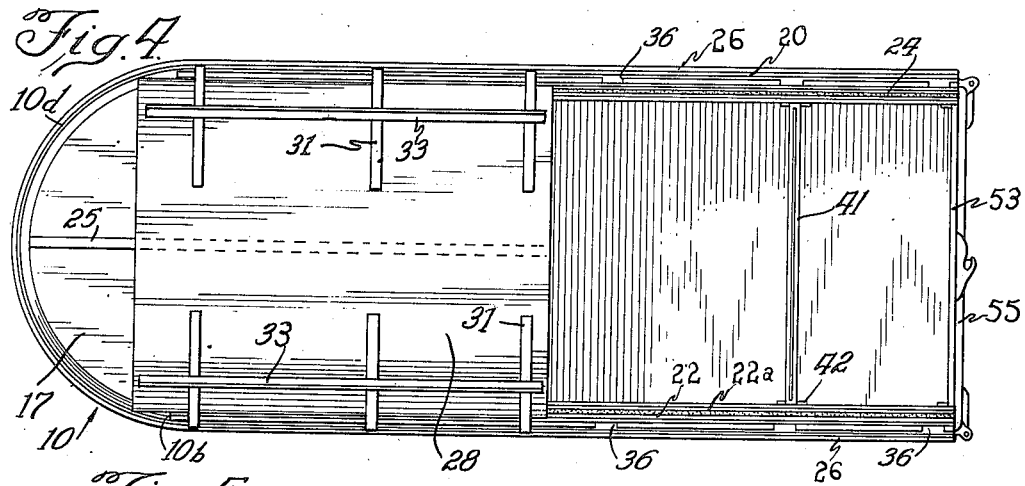
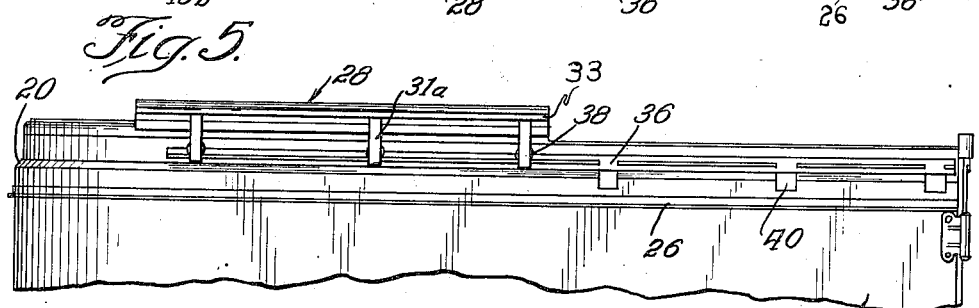
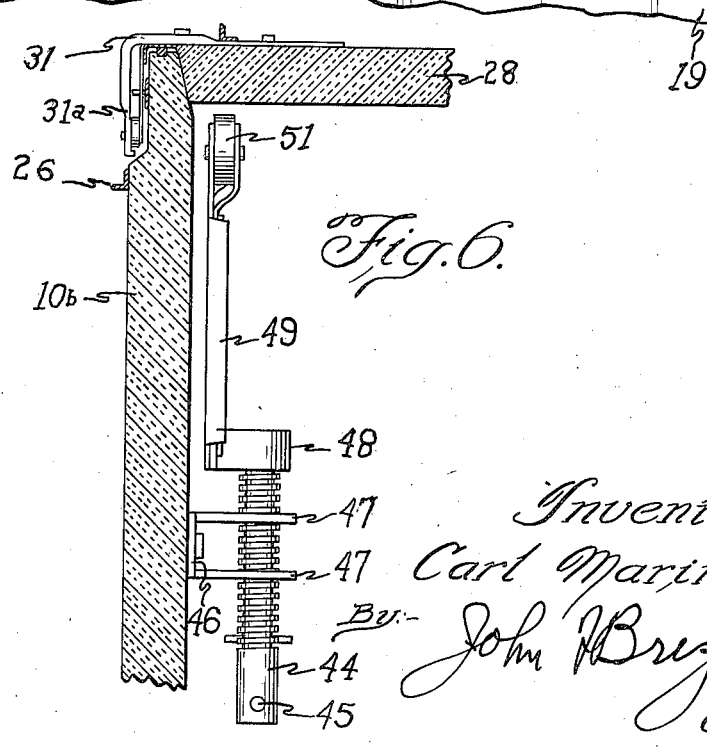
Inventor:
Carl Marinello
By:- John Brezina
Atty.

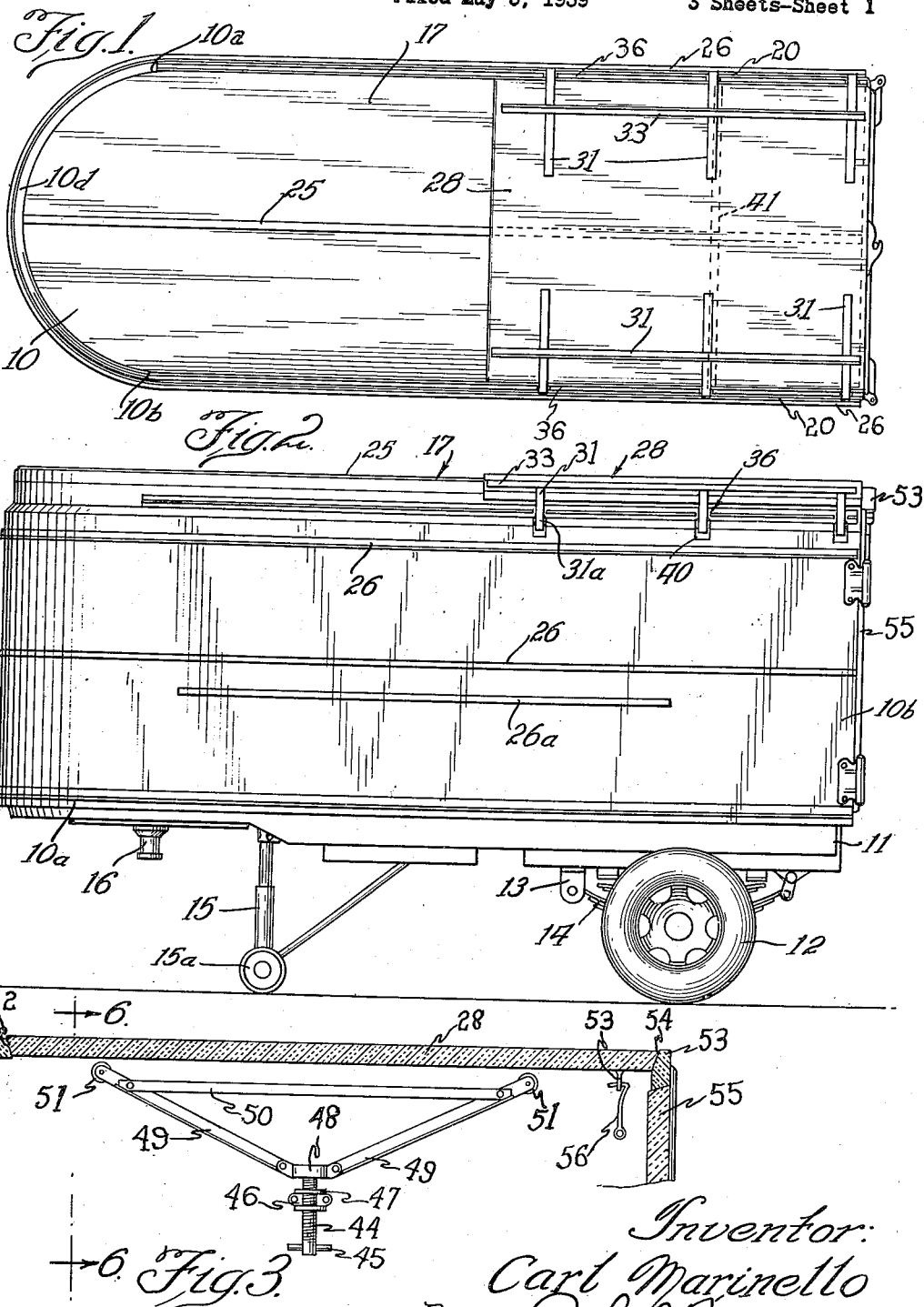

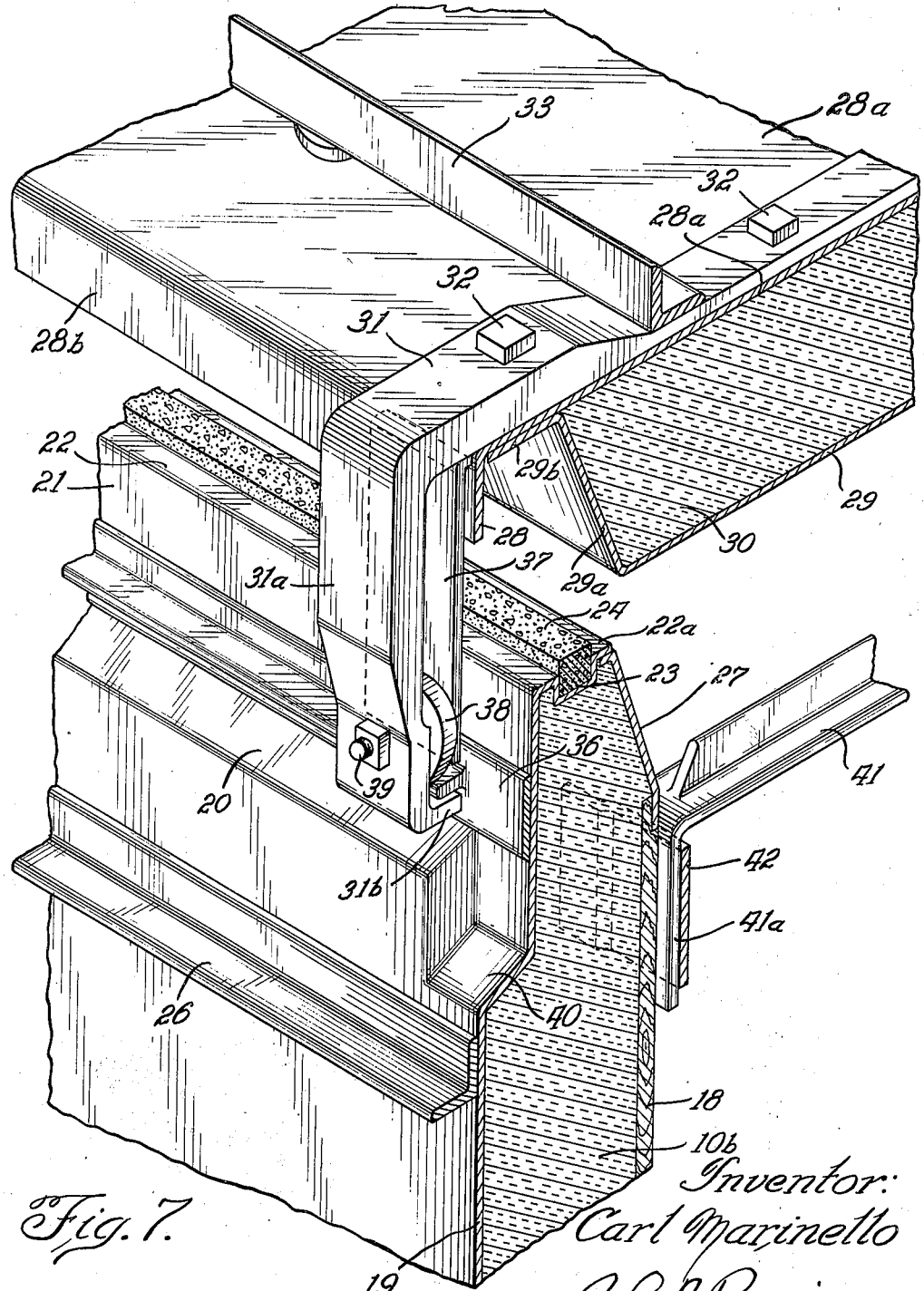

Patented May 28, 1940

2,202,015

UNITED STATES PATENT OFFICE 2,202,015

TRUCK BODY CONSTRUCTION

Carl Marinello, Chicago, Ill.

Application May 3, 1939, Serial No. 271,495

8 Claims. (Cl. 296—137)

This invention relates to and is directed to a novel body construction for trucks, trailers, semi-trailers and the like. In particular it is directed to certain removable structural features, and combinations thereof, of an inclosed type body in which a portion of the roof or top is mounted for both vertical and slidable movement so as to present a substantial portion of the truck and trailer body to be open from the top, to permit loading of heavy objects with standard equipment such as overhead cranes or derricks.

Presently known commercial vehicle bodies of the inclosed type are usually provided only with the conventional rear gate or rear hinged doors, or occasionally with side doors which open into vertical planes. This is especially true of refrigerated, insulated truck and trailer bodies which are usually provided only with a pair of rear cooperating doors. An important problem confronted in the use of the larger type of truck and trailer bodies which transport merchandise over substantially long distances is that the refrigerated truck or trailer travels loaded either to or from a commercial center where the meat packing and food packing plant is located to one or more destinations, and it is impossible to procure a pay load for a return trip, except a load which consists of such merchandise as can be loaded by hand, i. e., boxes, packages, and the like. None of the inclosed transport trucks, especially of the refrigerated type, have been able to secure the business of hauling relatively large or heavy lots or parcels of steel and iron products such as trusses, bars, and the like because the problem and expense of manual labor in loading and unloading such large and heavy units of merchandise had made it unprofitable, and as well, steel and iron mills and factories where large and heavy units are manufactured handle their respective heavy merchandise in no other way than with mechanical derricks and crane equipment with which it is possible only to load into transportation cars and trucks which are exposed and opened from above.

My invention solves this problem and eliminates the objections pointed out, and has as one of its objects the provision of a body construction for trucks, trailers, and semi-trailers of any desired size of a suitably mounted section, slug, portion or top panel together with suitable trackage mounted with respect to the side section and panels to promote selective slidable movement of the removable section or slug to expose from above the interior of the trailer body.

A further important object of my invention is the provision of a normally inclosed type body for trucks and trailers in which a portion of the roof or top is stationary and permanent and another portion of such roof or top is formed separately and mounted for horizontal sliding movement to desired position over the stationary portion of the body top to expose from above the interior of the body. A further object is to provide a longitudinally sliding section, panel or slug with suitable means so that it will be movable vertically into and out of said position with respect to the sides of the body, and into and out of substantially sealed position constituting an air impervious engagement with the upper portion of the side walls of the truck body.

A further object of my invention is the provision of a novel construction of vertically and horizontally movable top section or slug for an inclosed type vehicle body in combination with spaced apart angular brackets, wheels or rolls on such angular brackets, and recessed longitudinally extending tracks mounted on opposite sides respective of the side walls of the vehicle body.

A further object of my invention is the provision of a convertible and novel construction of inclosed type of vehicle body particularly of insulated and refrigerated inclosed body normally used for perishable goods provided with a vertical and horizontal movable top section or slug having downwardly extending flanges, along each side edge and having an inclined beveled seating and sealing surface along each side edge, which inclosed surface cooperates and seats into and with inclined bevel surfaces respective of the upper portions of the side walls of the truck body to thereby form an efficient and effective seal such as required in refrigerated bodies.

A further object of my invention is the provision of a truck or trailer body construction wherein a portion of the top or roof is mounted for vertical and horizontal longitudinal movement, together with rollers, bracket means for mounting said rollers, and recessed tracks mounted on the body side walls, such side walls also being provided with recesses, and co-incident recesses on said tracks so that when it is decided to replace the movable section or slug, it may be rolled back above normal position and the rollers and portions of the bracket means of carrying said rollers will descend in said track recesses and said side wall recesses respectively.

Other and further important objects of my invention will be apparent from the following descriptions and claims.

On the drawings:

Fig. 1 is a top plan view showing a conventional semi-trailer body of the refrigerated type and showing the movable top section or slug in closed position.

Fig. 2 is a side elevational view of a typical refrigerated type semi-trailer body embodying the features of my invention.

Fig. 3 is a cross sectional view of a fragment taken along a vertical plane of the movable roof or top section and showing the lever lifting mechanism of one of the interior side walls of the vehicle body.

Fig. 4 is a top plan view of a vehicle body embodying the invention and showing the movable top section or slug moved to an extreme forward position.

Fig. 5 is a fragmentary side elevation of the vehicle body illustrated in Fig. 4 and showing the top section or slug in extended forward position.

Fig. 6 is a cross sectional view taken through a portion of the movable body top section and showing the lifting mechanism and the movable section in an upraised position.

Fig. 7 is an enlarged perspective and cross section view of a corner section fragment of the truck body embodying my invention.

As shown on the drawings:

Referring to the drawings, reference numeral 10 designates generally a truck or vehicle body which may be of either the regular truck, trailer or semi-trailer type, having a floor 10c and vertical side walls 10a and 10b which converge together at their forward ends forming a rounded front 10d. The body is mounted upon a suitable frame or chassis 11 which in turn is mounted upon suitable traction wheels 12 through means of brackets 13 and springs 14 in conventional manner.

Numeral 15 designates a pivoted support having wheels 15 journaled with respect thereto to provide means for temporary support for the semi-trailer body in loading position. The chassis or frame is provided with a conventional downwardly extending rack and king pin 16 through which the trailer body is connected to the tractor.

Number 17 designates the stationary and fixed front portion of the refrigerated body which preferably covers a little more than one half of the roof or top area. The particular body which is illustrated in the example of the drawing is an insulated refrigerated body adapted for use in normally transporting perishable products. As will be seen from Fig. 7, the edge side walls 10a and 10b generally denoted are formed of walls and panels 18 preferably made of wood, and of separated outer metal walls 19, the space between said inner and outer walls 18 and 19 respectively, being filled with suitable insulating material in order to provide an efficient insulated body which will retain and maintain cold temperatures within the inclosed body.

The outer sheet metal wall 19 is bent angularly and inwardly to form a bead 20 and thence extends upwardly and vertically to form a longitudinally extending side wall portion 21, and is thence bent at right angles and horizontally, and thence again downwardly and again horizontally and then upwardly and horizontally to form the two longitudinally extending upper edge surfaces 22 and 22a, said surfaces being formed by the longitudinal horizontally bent edge flange of the outer metal wall 19, and also providing a longitudinally extending groove or recess 23 between said upper edge surfaces 22 and 22a.

Numeral 24 designates a strip of suitable yieldable resilient insulated material such as soft rubber which is mounted in said longitudinal groove 23 and extends thereabove as indicated in Fig. 7. Fig. 7 shows a section of the left side wall of the vehicle body, and it is to be borne in mind that the opposite and right side wall is similarly constructed as above described.

The construction of side wall last above described extends from the rearmost edge of each side wall 10a and 10b to the junctures thereof with the stationary and permanent front top or roof designated by reference numeral 17. In the construction of the trailer body the stationary and permanent forward roof section 17 is of course joined to the side walls of the body and to the front wall 10d thereof in suitable and conventional manner so as to provide a satisfactory insulated joint which will efficiently exclude heat and aid in maintaining desired temperatures within the refrigerated body. Said stationary and permanent forward roof section 17 is therefore likewise suitably insulated in a known manner, and is preferably slightly arched or rounded so that the longitudinally central portion is slightly higher than the sides thereof. The stationary and permanent forward roof and top section 17 is also provided with an exterior metal bar or rail 25 which acts as an anti-friction rail if and when the central portion of the movable and slidable top section or slug should sag to any degree and slide therealong.

Numeral 26 is one of two exterior metal reinforcing and protection rails, each of which is suitably secured in horizontal position upon the exterior of the side walls 10a and 10b respectively a short distance below the upper edges thereof. Numerals 26 and 26a (Fig. 2) designate longitudinally extending reinforcing beads formed in the outer metal walls of the side walls 10a and 10b respectively.

Numeral 27 designates a channel-like longitudinally extending member which has its lower edge secured to the respective inner walls 18 of the body side walls 10a and 10b and its upper angularly bent flanged edge secured by welding or the like to the respective edge flange 22a, as illustrated in Fig. 7. This metal member 27 is inclined as shown and presents a seating surface along each of the side walls 10a and 10b, which seating surface extends from the rear edge of each of said side walls to the rear edge of the stationary and permanent roof or top section 17.

The movable roof or top section or slug which is adapted to removably seal the top opening of the refrigerated type body, which opening extends from one side wall to the other and from the rear edge of the permanent top section 17 to the rear edge of the body, is designated generally by numeral 28 and consists principally of an outer sheet metal panel 28 having its opposite lateral edges 28b turned perpendicularly and downwardly to form flanges as clearly illustrated in Fig. 7. The removable top slug or section 28 also includes the spaced apart inner metal panel 29 which has its lateral edges bent angularly at an obtuse angle to form inclined seating sections or surfaces 29a, and said opposite lateral edges of inner metal panel 29 are again turned angularly to form flanges 29b which are adapted to lie flat against the outer metal panel 28a and be suitably secured by welding or the like. This construction provides an interior chamber which is filled with suitable insulating material. This inclined and beveled surface 27 of the side walls 10a and 10b respectively is engaged by the removable section 28 when the latter is in a lowered closed position. This provides an efficient seal to prevent undesirable absorption of heat and escape of cold air from within the body. When the removable slug is in a closed sealed position as aforesaid, longitudinal side flanges 29b rest upon the yieldable insulating strips 23 and this provides an effective auxiliary seal for the refrigerated body. The downwardly extending side flanges 28b rest immediately outside the surface of the longitudinally extending panel sections 21 respectively, which acts to prevent entry of snow and rain into the vehicle body.

The removable top section or slug 28 is provided with a plurality, preferably six, of spaced apart angular brackets 31, each of which are formed with two or more spaced apart apertures through which bolts or rivets 32 pass to secure said brackets to the upper surfaces of the removable top section or slug 28, substantially as illustrated in the drawings. The outer projecting portions of the angular brackets 31 are bent at right angles and downwardly to form extending bracket portions 31a which are apertured at lower ends, and the exterior lower ends of which are again bent angularly and inwardly toward the side walls of the truck body to form retaining flanges 31b which normally slide below the tracks herein described. Reference numeral 33 designates two spaced apart longitudinally extending reenforcing rails which traverse the respective brackets 31 and which are secured thereto by welding or the like in substantially the position illustrated in Fig. 1.

Numerals 34 and 35 designate two tracks constituting two metal rails or bars of T-cross section, the base portion of each of which tracks are secured to the outer metal panel 19 of each of the respective side walls 10a and 10b of the truck and in a position a short distance below and parallel to the uppermost edge of the side walls 10a and 10b. These T-shaped rails or tracks 34 and 35 extend from the rear end of each side wall to point a short distance rearward of the front of the truck body, substantially as illustrated in Figs. 1 and 2, that is, a distance sufficiently rearward to permit sliding movement of the removable top section or slug 28 entirely above the stationary roof section 17.

An important feature of my construction is the provision of an arrangement and position of a plurality of spaced apart slots or recesses 36, preferably three in number, in each side rail or track, these slots or recesses being formed only in the perpendicularly and horizontally extending portion of the T-shaped tracks 34 and 35, and in positions to correspond to and to register with the spaced apart brackets 31. Of similar importance is our provision of the feature of spacing the two foremost brackets 31 at a greater distance from the two intermediate brackets 31 than the space between such intermediate brackets and the rear-most two brackets 31. The slots in the respective tracks or rails 34 and 35 are likewise and similarly not uniformly spaced for reasons hereinafter explained.

Each of the brackets 31 is provided with a downwardly extending inner spaced apart metal brace 37 which has an aperture at its lower end, and metal wheels and rollers 38 are journaled on bolts 39 which are mounted in the aligned apertures of the respective braces 37 and of downwardly extending portions 31a of said brackets, as illustrated in Fig. 7.

Each of the outer metal panels 19 of said walls 10a and 10b are also provided with a plurality, preferably three, of exteriorly opening recesses 40 which are immediately below the respective recesses 36. When the removable top section or slug 28 is in a seated or sealing position, the lower ends 31a of the respective brackets 31 lie in the recesses 40.

When it is desired to remove the movable top section or slug 28 from closed seating position, it is first raised and lifted vertically, and it is raised to a position where the bottom surface of the respective rollers 38 are in alignment with the horizontally extending flange of the rails 34 and 35. Then the top section or slug 28 is moved horizontally toward the front of the body to cause the respective rollers 38 to ride upon the flanges of the rails 34 and 35 respectively. The top section or slug is thereby moved as far forward as is desired, and it may be suitably hooked either in an extreme forward position or in any intermediate position desired.

When the removable slug is moved to forward position above the stationary roof section 17, I find it advisable to provide a metal bar 41 which has its ends bent at right angles to form hook-like ends 41a which are mounted behind metal strap-like anchoring brackets 42, said brackets 42 being secured to the inside surface of side walls 10a and 10b. The position of this bar is preferably a short distance from the rearmost end of the body, as illustrated in Fig. 4.

The engaging action of the lower portions of the respective brackets 31 against the track rails 36 respectively prevents undesirable vibrations of said walls 10a and 10b when the body is in transport on highways and roads which frequently are rough and bumpy. This insures that the side walls of the body and the body itself will retain their proper position throughout the entire time that the removable slug or section is both in seating position and in open position, and the elimination of these objectionable features which are so common in ordinary side panel open top truck bodies is an important accomplishment of my invention.

The removable section or plug which I have described herein comes especially in the refrigerated insulated type body wherein a double wall and intermediate insulated construction is utilized, is of substantial weight, and while a single driver could move and elevate this section or slug from closed sealing position between the body side walls, especially with the use of appropriate bars or levers utilizing lever action, nevertheless I find it advisable to provide an inexpensive and easily operable means or mechanism for lifting the removable roof section or slug from seating closed position to a plane wherein the lower surfaces of the rollers will be on at least an even plane with the upper surface of the guide rails.

Such means of mechanism comprises vertically mounted threaded hand screw 44 having a suitable handle 45 at its lower end, and being threaded in threaded apertures of the two spaced apart horizontally extending arms 47 of the U shaped mounting brackets 46. Each of said mounting brackets d are secured to the inner surface of each of said side walls of the vehicle body at points substantially equally distant from the forward end and rearmost end of the roof opening, or from the forward and rear ends respectively of said roof section, by means of suitable screw bolts passing there thru and into the respective side walls, as shown in Figs. 3 and 6.

The upper end of the hand screws 44 is reduced and journaled in rotation in a suitable aperture of a metal yoke or ring member 48, said ring member 48 having diametrically opposite extending apertured ears. A pair of levers 49 have their adjacent ends secured to the ring member 48 as illustrated in Fig. 3, and the opposite and upper ends of seated levers 49 are maintained in inclined position as illustrated by means of a metal connecting link 50 whose opposite ends are secured to seated levers 49. Journaled on the outer ends of each of the arms and levers 49 are relatively small rollers 51 which rotate on a suitable axio pane or rivet as illustrated.

When it is desired to elevate the removable roof section or slug from closed seated and sealing position, such as illustrated in Fig. 3, the operator may rotate the screw 44 in right direction to cause elevation of seated lever arms 49 and simultaneously elevation of the side of the movable roof section which is then being raised. When the driver or operator has elevated one side of the movable roof section to a sufficient height to permit it being pushed longitudinally to ride on the respective rollers, he will then move to the other side of the truck and raise the other side in the same manner, and when both sides are moved to sufficient height, usually a distance of from 1½ to 2 inches, the operator needs only to push or thrust the movable roof section or slug forwardly, and rolled upon the aforedescribed track rails as forwardly as he desires. It is to be understood that the track rails which have been described, extend sufficiently far toward the front of the vehicle body to permit rolling of the removable roof section entirely over the stationary forward roof portion of the body, in which position said removable roof section is secured by suitable hooks.

When the removable roof section of the body is in the forward superposed position and exposing from above substantially the rear half of the truck body whose over-all length is 20 to 22 feet, the aforesaid opening permits loading of large and heavy objects, merchandise and miscellaneous, above the use of standard overhead crane equipment which is almost exclusively used in the heavy goods industries such as iron and steel.

While I have described and illustrated one particular form of lifting means which includes the hand actuated screws 44 and arms or levers 49, it is to be understood that equivalent arm and lever mechanism may be utilized in place of the hand screw, bracket and arms or levers illustrated without disturbing a principle of my invention, it being understood that those skilled in the mechanical arts might, without difficulty, adopt and use modifications constituting a lifting means or lifting mechanism within the scope of my invention.

Referring particularly to Fig. 3, which illustrates a fragmentary and longitudinal section through a portion of a refrigerated truck or vehicle body, and wherein the lifting mechanism is illustrated as being mounted on one of the inside walls of the vehicle body. The removable slug or roof section 23, which itself is an insulated unit, is illustrated in seated position between the substantially beveled or inclined rear edge 52 and the inwardly facing beveled surface 54 of the transversely extending and reinforcing frame member 53 which connects the upper portions of the body side walls at the rear end of the truck, and which also, with other parts, defines the rear door opening. In Fig. 3, a fragment of a door 55, is illustrated in cross section. Numeral 56 illustrates a pivoted metal hook which is suitably anchored for pivotal movement on the inside wall of the truck body substantially in the position illustrated in Fig. 3, said hook engaging a suitable downwardly extending eyelet 57 on the movable roof section to hold said movable roof section against even the slightest upward movement which might be caused by road shocks and road bumps.

When the truck or vehicle body is exposed from above as aforesaid, and with the movable roof section anchored in forward superposed position, it is desirable that and where the load to be transported does not permit the replacement of said multiple roof section to closing position, it is desirable to prevent transverse diagonal and angular stresses and undue vibration of the relatively heavy insulated side walls of the normally refrigerated body. To accomplish this object, and to prevent undesirable twisting, bending, of the side walls and portions thereof of the body, I provide the removable cross bar 41 whose angularly bent ends are hooked as before described behind brackets 42, secured in inside surfaces of the vertical side walls with the truck body.

I am aware that various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof.

I claim as my invention:

1. In a vehicle body having spaced apart vertical side walls; a stationary roof section covering the forward portion of the vehicle body, longitudinally extending rails mounted on the vertical surfaces of the body side walls adjacent to the upper edges thereof; said rails having spaced apart recesses therein; a movable roof section adapted to cover and seal the rear-most portion of said vehicle body from above; a plurality of angular brackets secured in spaced apart relation on said movable roof section and having downwardly extending ends and a plurality of rollers journaled on the lower ends of said brackets and adapted to ride on said side rails whereby said movable roof section may be moved longitudinally into and out of closed position, said rollers and said lower bracket ends being adapted to drop thru and be in said recesses respectively when said movable roof section is moved into closed sealing position the lateral edges of said movable roof section being formed to define inverted substantially U-shaped channels which engage the upper edges respectively of the side walls to prevent twisting and undesirable movements thereof.

2. In a motor vehicle body, a floor and upwardly extending side walls and connecting front wall said side walls having opposed inwardly facing beveled corner surfaces; a stationary roof portion connecting the forward portions of said side walls and said front wall, the rearward edge thereof terminating at a point substantially forwardly of the rear end of said body; a vertically and slidably movable roof section adapted to normally cover and seal the rear portion of said body, the lateral edge portions of said movable roof section having outwardly facing inclined surfaces adapted to seat in frictional engagement with the corner surfaces of the upper edges of the body side walls; a longitudinal downwardly extending flange on each of the lateral edges of said movable roof section and forming a stop against stretching stresses of said side walls; a rail mounted on the exterior of each of said side walls below the upper edge thereof; spaced apart angular brackets on said movable roof section and extending downwardly; and roller members journaled on said brackets and adapted to ride on said rails when said movable roof section is moved longitudinally, said rails and said side walls having spaced apart exteriorly opening recesses to provide for descent of said movable roof section and to permit passage of said roller members and bracket portions to permit seating of said movable roof section.

3. In a motor vehicle body, a floor and upwardly extending side walls and connecting front wall; a roof portion connecting the forward portions of said side walls and said front wall, the rearward edge thereof terminating at a point substantially forwardly of the rear end of said body; a vertically and slidably movable roof section adapted to normally cover and seal the rear portion of said body, each of the lateral edges of said movable roof section being formed to define an inverted substantially U-shaped groove including an integral exterior flange adapted to hook over the upper edge of the adjacent side wall in frictional seating engagement with the upper edges of the body side walls; a rail mounted on the exterior of each of said side walls below the upper edge thereof and having spaced apart recesses therein the foremost recess of each rail and the corresponding roller members being positioned farther apart than the distance between the rear most recess of each rail and the rearmost roller members to prevent descent of said roller members and movable roof section during opening and closing longitudinal movements thereof; spaced apart angular brackets on said movable roof section and extending downwardly and exteriorly of said side walls; roller members journaled on the lower ends of said brackets respectively and adapted to ride on said rails respectively when said movable roof section is moved longitudinally, said recesses receiving and permitting descent said roller members and the lower portions of said brackets respectively when said movable roof section is mounted in closing position, said inverted U-shaped portions of said roof sections seating about the upper edges of said side walls to prevent undesirable side movements of said side walls, and manually operable lifting mechanism mounted on said side walls for raising said movable roof section to permit rolling thereof with respect to said tracks.

4. In a vehicle body, a floor and upwardly extending side walls and front wall; a roof portion connecting the forward portions of said side walls and said front wall, the rearward edge thereof terminating at a point substantially forwardly of the rear end of said body; a vertically and slidably movable roof section adapted to normally cover and seal the rear roof opening of said body, and roof section comprising a rectangular body having its lateral edges formed to present inverted longitudinal grooves or channels which are adapted to seat in frictional seating engagement with the upper edges of the body side walls; a pair of longitudinally extending rails mounted on the body side walls respectively and below the upper edge of each of said side walls; a plurality of mounting brackets on said removable roof section having downwardly extending ends; track rails secured on the exterior of said side walls and extending longitudinally, said guide rails having spaced apart recesses therein; a plurality of rollers journaled on said mounting brackets adapted to ride on said rails respectively when said removable roof section is moved longitudinally, said rollers and lower ends of said brackets being adapted to drop through said rail recesses respectively to permit seating and sealing engagement of said roof section in closed position, and manually operable mechanism secured on the inner surface of said side walls below their upper edges respectively for elevating said movable roof section from seated position to a position permitting longitudinal movement thereof.

5. In a motor vehicle body, a floor and upwardly extending side walls and front wall; a roof portion connecting the forward portions of said side walls and said front wall, the rearward edge thereof terminating at a point substantially forwardly of the rear end of said body; a vertically and slidably movable roof section adapted to normally cover and seal the rear portion of said body, the lateral edges of said movable roof section being in frictional seating engagement with the upper edges of the body side walls; a pair of longitudinally extending rails mounted on the body side walls respectively and below the upper edge of each of said side walls; a removable slug having longitudinally extending channels along the edges thereof and adapted to straddle the upper edges of said side walls to close the opening between the upper edges of the body side walls and to prevent undesirable sidesway of the side walls; a plurality of mounting brackets on said removable roof section having downwardly extending ends; track rails secured on the exterior of said side walls and extending longitudinally, said guide rails having spaced apart recess therein; a plurality of rollers journaled on said mounting brackets adapted to ride on said rails respectively when said removable roof section is moved longitudinally, said rollers and the roller ends of said brackets being adapted to drop through said rail recesses respectively to permit seating and sealing engagement of said roof section in closed position; and manually actuable mechanism secured on the body side walls for elevating said slug from closed seated position to permit longitudinal sliding movement thereof to open position.

6. In a vehicle truck body having vertical side walls, and a stationary roof section covering the forward portion of said body, the rear portion of said body being openable at the top; a slidably mounted movable roof section adapted to close and seal the rear top opening; means for slidably mounting said movable top section for longitudinal sliding movement to positions over said stationary roof section including a pair of track rails on the body sides respectively; angular brackets on said movable top section; rollers on said brackets adapted to engage said track rails respectively; and manually actuable means for elevating said movable top section from closed seated position between the upper edges of said body sides to permit selective longitudinal sliding movement of said top section along said rails respectively.

7. In a vehicle truck body having vertical side walls, and a stationary roof section covering the forward portion of said body, the rear portion of said body being openable at the top; a slidably mounted movable roof section adapted to close and seal the rear top opening; means for slidably mounting said movable top section for longitudinal sliding movement to positions over said stationary roof section including a pair of track rails on the body sides respectively; angular brackets on said movable top section; rollers on said brackets adapted to engage said track rails respectively; manually actuable means for elevating said movable top section from closed seated position between the upper edges of said body sides to position supported by said rollers to permit selective longitudinal sliding movement of said top section, said elevating means comprising a pair of hand screws, brackets for securing said hand screws on the said side walls respectively; and angular cross bars mounted for vertical movement on said body sides respectively, the elevation of said hand screws being adapted to raise said angular cross bars and said removable roof section from lower closing and seated position to permit sliding movement thereof.

8. In a body for vehicles having vertical side walls and a stationary roof portion connecting the upper edges of said side walls across the front of said body, the rear portions of said body sides terminating in exposable longitudinal edges; a movable roof section for normally closing the upper opening of the rear portion of said vehicle body and adapted to seat and rest upon the upper longitudinal edges of said side walls; a plurality of brackets on said movable roof section; rollers journaled on the lower ends of said brackets respectively; a longitudinally extending track rail mounted on the side of each of said side walls and below the upper edge thereof, said track rails having a plurality of spaced apart recesses positioned to permit vertical up and down movement of said movable roof section, said brackets and said rollers from or to normally seated closed position of said movable roof section; and selectively operable means including a manually operable member and connected levers on the inside of the walls of said body for raising said movable roof section from closed seated position to permit longitudinal opening movement of said roof section and riding engagement of said rollers on said track rails respectively, the respective recesses of each rail and the mounted rollers engaging each rail being non-uniformly spaced apart to prevent descent of said movable roof section during its longitudinal movement.

CARL MARINELLO.